United States Patent Office.

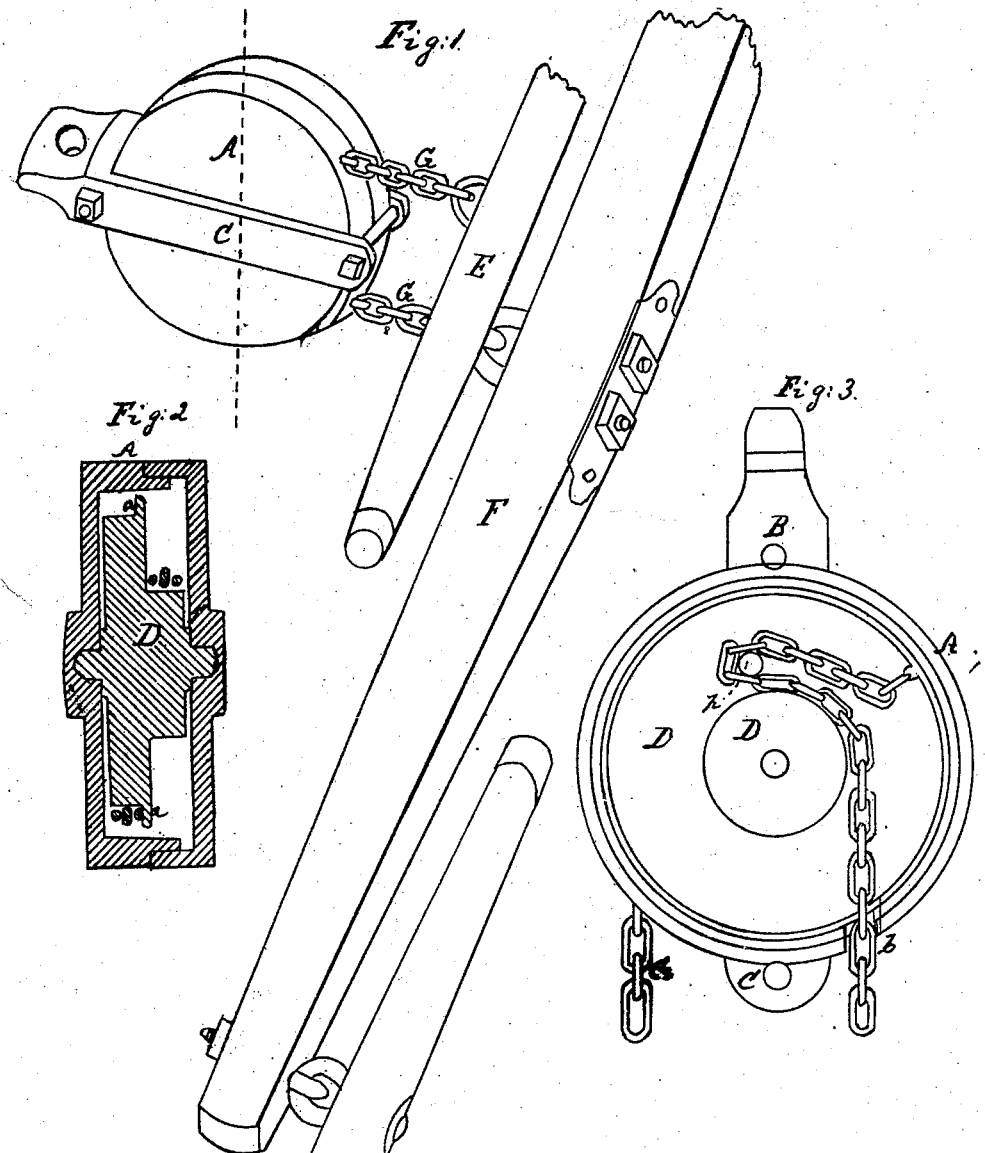

GILES CRAMTON, OF MARSHALL, MICHIGAN.

Letters Patent No. 74,053, dated February 4, 1868.

---

IMPROVEMENT IN THREE-HORSE EQUALIZER.

---

The Schedule referred to in these Letters Patent and making part of the same.

---

TO ALL WHOM IT MAY CONCERN:

Be it known that I, GILES CRAMTON, of the city of Marshall, in the county of Calhoun, and State of Michigan, have invented a new and useful Improvement in "Three-Horse Equalizers;" and I do hereby declare that the following is a full, clear, and exact description of the construction and operation of the same, reference being had to the annexed drawings, making a part of this specification, in which—

Figure 1 is a perspective view.

Figure 2 is a cross-section in the line $x$.

Figure 3 is a plane view, half casing removed.

Similar letters of reference indicate like parts in all the figures.

My invention relates to a device to be coupled with a plough, stone-boat, or any vehicle, or machine, or implement to be drawn by a team of three horses working abreast, for the purpose of more perfectly equalizing the power of draught between the single middle horse and the two outer ones, also to give more compactness and protection to the several parts, and prevent the constant tangling to which the hitching-gear is so subject in other devices for this purpose; and the better to enable others skilled in this branch to construct my invention, I will now proceed to describe it with sufficient minuteness.

A represents a hollow circular disk, of cast iron, constructed in two equal parts, which I generally bolt together through a coupling-tongue, B, on one side, and on the other through the projecting end of a band, C, which I cast on the faces, to confer strength, and additional thickness for pulley-bearings, to be hereinafter described; and I lock the edges of the disk-rims together by a rabbet-joint, to keep them firmly in place, as may be clearly seen in the section, fig. 2. The two rimmed disks, when thus bolted together, form a case, within which I hang the pulley D, of two steps, the diameter of the smaller step-face being only half that of the larger one, and the pulley-steps may be either flat, as seen in fig. 2, or grooved, as shown by the dotted lines, to receive the hitching-chain, which passes partially around them, and connects them with the single middle horse whiffle-tree E, and the double-tree F, (broken off,) to which the two outer horses are hitched.

The disk or case A, may, if desired, be made to conform in shape with the steps of the pulley, and should be just large enough to allow the pulley and its chain to work freely inside, care being taken that the portion of chain on the large pulley be confined laterally, if necessary, by a flange, $a$, or other equivalent device.

I prefer connecting the pulleys with the single and double-tree, by one length of chain, G, seen in fig. 3; a link near the middle being inserted snugly in a cross-notch in the pulley-flange, and a portion of the chain carried back and bent round a pin, $p$, and over a portion of the small pulley, and through the rim, as at $b$. The other half, passing over part of the large pulley's periphery, goes through the opposite disk-rim, and is hitched in any of the ordinary ways to the whiffle-tree E, while the other end connects, of course, the pulley of smallest leverage with the double-tree, to which the outer horses are hitched.

Any suitable coupling-device, adapted to the thing to be drawn, cast, or otherwise connected with the casing, may be used in place of the coupling-tongue B; nor is it essential to employ a single chain to act on both faces of the pulley D, as hereinbefore described, for a separate chain, or a tug of any proper kind, may be hitched to each face by a pin, $p$, or equivalent device, and produce substantially the same effect.

When the equalizer is connected, by its coupling-tongue, B, to the thing to be drawn, and its pulley-chains are hitched, as previously described, to the respective teams, the ability of the two outer horses to get ahead is neutralized, by reason of their portion of the hitching-chain passing over the pulley of half size or leverage, and, if either team should occasionally get the start a little, it is unimportant, for they may come and go a distance nearly equal to that around the entire periphery of the half-sized pulley, and the relative leverage be constantly maintained.

I am aware that the arrangement of the double and single-tree, in connection with a long and short lever, is not new; nor do I claim passing the hitching-chains over arcs of circles of different radius, or of connecting them, in a broad sense, with levers of any description; but I believe that my arrangement produces both novel and much-improved results for the designed use, over all others, being more compact, and adapted for general use with a three-horse team. The chain, being encased, cannot get out of place on the pulleys, nor can it draw out, on account of the ring, hook, or other hitching-device, at its ends; permits greater length of play, while preserving the equalization, and is simple and cheap in construction.

Having described my invention, what I claim, and desire to secure by Letters Patent, is as follows:

I claim the arrangement and combination of the pulley D, coupling-tongue B, pin P, hollow-disk casing A, and hitching-chain or chains G, with the whiffle-tree E, and double-tree F, of a three-horse team, substantially as and for the purpose herein described.

GILES CRAMTON.

Witnesses:
 JOHN FARRELL,
 OTTO L. JOHNSON.